(No Model.)
W. B. MERRITT.
DEVICE FOR CLOSING TUBE PUNCTURES.
No. 570,942. Patented Nov. 10, 1896.
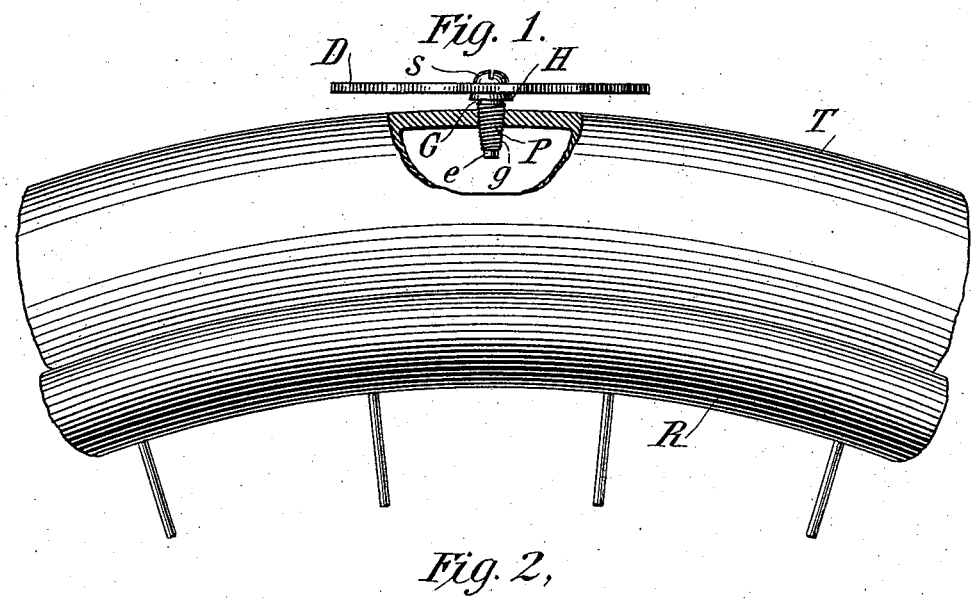
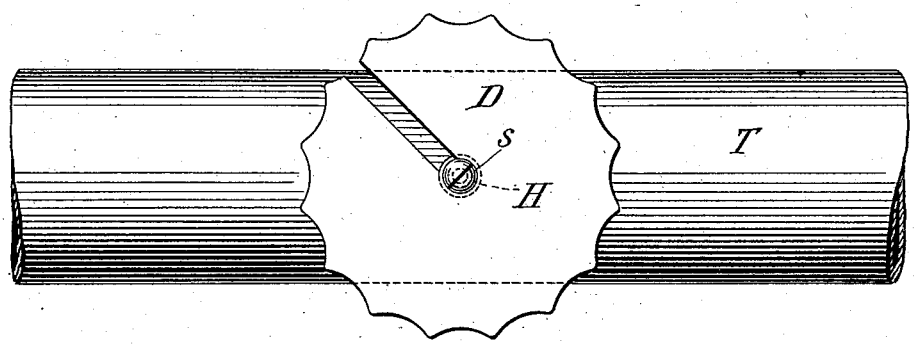
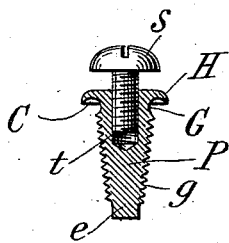 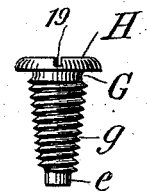 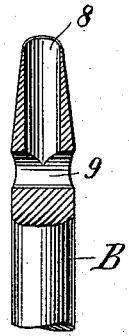
WITNESSES:
C. E. Ashley
H. W. Lloyd
INVENTOR:
William B. Merritt
By his Attorney

UNITED STATES PATENT OFFICE.

WILLIAM B. MERRITT, OF BRAINTREE, MASSACHUSETTS, ASSIGNOR OF TWO-THIRDS TO GEORGE W. ARNOLD AND EDWARD H. KINNEY, OF BROOKLYN, NEW YORK.

DEVICE FOR CLOSING TUBE PUNCTURES.

SPECIFICATION forming part of Letters Patent No. 570,942, dated November 10, 1896.

Application filed May 19, 1896. Serial No. 592,108. (No model.)

*To all whom it may concern:*

Be it known that I, WILLIAM B. MERRITT, a citizen of the United States, and a resident of Braintree, in the county of Norfolk and Commonwealth of Massachusetts, have made certain new and useful Improvements in Devices for Closing Tube Punctures, of which the following is a specification.

My invention is an improvement in devices for repairing punctured tubes or pipes of flexible material, like rubber, frequently employed for wheel-tires for such vehicles as bicycles. These tubes are usually expanded by air under pressure and often become punctured in use and when at a distance from convenient facilities for repairing.

The object of my invention is to provide a mechanical device occupying small space, which can be quickly applied without the use of special tools and in exposed and otherwise inconvenient locations.

My invention consists of a single integral piece preferably formed of metal, such as iron or steel; but hard rubber or any material sufficiently inflexible to manipulate may be employed. At one extremity I form a head, flange, disk, or enlargement, and permanently joined to this head and forming part of the structure is a tapering projection like a pyramid or cone. At the junction of the head and cone I place a groove or channel to form a seat for the edges of the punctured tube when the device is in position. The cone or tapering surface approximates a point at the other or second extremity, or it is of small diameter to form an entering end. In the surface of the cone I place a helical groove extending from the described circular groove to a point at or near the entering end. I prefer a helical groove having at least three complete turns in a length equal to the thickness of the tube-wall, the object being to force the rubber wall or part thereof into the circular groove placed close to the head and into the concavity on the under side of the head. The under surface of the head or enlargement is made concave for this purpose, and also so that the edge of the concavity will enter or engage with the surface of the rubber or other tube to which it is applied.

The head is provided with an interior screw-thread to receive a machine-screw, and I provide a slotted plate which may be screwed to the head of the closing device and used to turn or rotate said closing device into position as the helical groove in its surface engages the edges of the tube puncture. Instead of employing a screw-hole in the head I may slot or slit the head or form it in any manner suitable to permit of applying a driving or turning tool by which the tapering closing device may be forced into position by turning or otherwise.

The device described is of great utility in repairing punctured bicycle-tires. The punctures in this class of tubes usually occur in the form of slits or slots and are produced by running over a fragment of glass or stone having a ragged cutting edge. When such a puncture is to be repaired, before applying the mechanical closing device I cut a round hole through the puncture with a belt-punch or similar tool, and in order to facilitate the introduction of the cone-piece I fix to it for such temporary use the above-described slotted or perforated plate, or I may employ any form of turning or driving tool.

The accompanying drawings illustrate my invention.

Figure 1 is a view of the plug or closing device in process of being inserted in the puncture in a rubber-tube wheel-tire. Fig. 2 is a top view of the same. Fig. 3 is a vertical cross-section of the closing device or plug with the screw for holding the driving plate or tool in position. Figs. 4 and 5 show a modification, and Fig. 6 is the punch employed to prepare the puncture to receive the plug.

The closing device or plug P has a head or enlargement H at one extremity, and integral with it is a tapering portion having a helical groove $g$ in its surface. The entering end $e$ is of small diameter, and at the junction between the head H and the conical or tapering portion there is a circular groove G. The under side or surface of the head H is concave, as at C. The object of the groove G and concavity C is to provide a seat for the edge of the punctured tube-wall, said wall being crowded into position by the wedge action due to the helical groove $g$, which, when the closing device is rotated, jams the rubber tube-wall into the groove G and cavity C, and the sharp edge of the concave head H enters or engages the outer surface of the tube.

In Fig. 6 is shown a punch B for cutting a round hole at or near the center of the puncture. It has a sharp cutting edge, as at 8, and a transverse perforation at 9.

In Fig. 3 the head of the closing device is shown as drilled out and screw-threaded at $t$ to receive a screw $s$. D is a slotted driving-plate for attachment to the closing device or plug P, as shown in Figs. 1 and 2, where it is employed as a turning or driving tool for rotating the plug into position. In Figs. 4 and 5 I have shown a modification in which the head H is slotted, as at 19, to receive a screw-driver end.

When a rubber plug or tire is punctured, I cut a round hole at or near the center of the puncture and insert the plug, say, half way, as shown in Fig. 1, by screwing the driving-tool D thereto. If possible, as is always the case when the rubber tube is a wheel-tire, I next force air in to render the tube more rigid, and I then continue the rotation of the driving-tool D until the edge of the concave head H engages the outer surface of the tube and until the helical groove in the surface has forced the edge of the rubber wall into the groove G and concavity C, which result is attained by making one or two turns after the edge of the head H engages the surface of the tube. I then disengage the turning or driving tool, remove screw $s$, and complete the inflation of the tube T until it is rigid in the rim R.

What I claim, and desire to secure by Letters Patent, is—

1. A device for closing the aperture in a punctured tube consisting of a single integral piece of inflexible material having a head, disk or enlargement at one extremity and tapering to a small diameter at the other extremity, to form an entering end, a circular groove or channel in the surface near said head to form a seat for the edge of the tube-wall and a helical groove in the tapering surface extending from said channel to a point at or near the entering end, substantially as described.

2. A device for closing the aperture in a punctured tube consisting of a single integral piece having a concave head disk or enlargement at one extremity and tapering to a small diameter at the other extremity to form an entering end, a circular groove or channel in the surface near said head to form a seat for the edge of the tube-wall, a helical groove in the tapering surface extending from said channel to a point at or near the entering end, and means for receiving, attaching or engaging a driving or turning tool at said head, substantially as described.

3. The combination of a perforated rubber tube and an air-tight plug for the puncture or perforation, said plug consisting of a tapering portion having a helical groove in its surface, a head or enlargement and a circular groove at the junction of the head and tapering portion, substantially as described.

4. The combination of a perforated rubber tube and an air-tight plug for the puncture or perforation, said plug consisting of a tapering part or portion, a disk-like head or enlargement therefor having means for connecting with a driving-tool and a helical groove in the surface of said tapering portion extending from a point at or near said head to a point at or near the opposite extremity, substantially as described.

WILLIAM B. MERRITT.

Witnesses:
JAMES T. WEEKS,
JOHN C. WEEKS, Jr.